United States Patent
Callendrier

(10) Patent No.: US 6,250,146 B1
(45) Date of Patent: *Jun. 26, 2001

(54) WEB TENSION TRANSDUCER APPARATUS

(75) Inventor: Thierry L. Callendrier, Parma, OH (US)

(73) Assignee: Cleveland Motion Controls, Inc., Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/395,437

(22) Filed: Sep. 14, 1999

(51) Int. Cl.[7] ........................................ G01L 5/04
(52) U.S. Cl. .................................................. 73/159
(58) Field of Search ............................ 73/510, 862.473, 73/159, 862.474, 862.638, 862.48

(56) References Cited

U.S. PATENT DOCUMENTS

| | | |
|---|---|---|
| Re. 31,312 | 7/1983 | Eddens . |
| 3,260,106 | 7/1966 | Hull et al. . |
| 3,439,761 | 4/1969 | Laimins . |
| 3,589,181 | 6/1971 | Palmatier et al. . |
| 3,763,701 | 10/1973 | Wright et al. . |
| 3,927,560 | 12/1975 | Farr . |
| 4,015,468 | 4/1977 | Simon . |
| 4,052,891 | 10/1977 | Bartlett . |
| 4,130,014 | 12/1978 | Eddens . |
| 4,281,539 | 8/1981 | Keller . |
| 4,326,424 | 4/1982 | Koenig . |
| 4,674,341 | 6/1987 | Koenig . |
| 4,735,102 | 4/1988 | Koenig . |
| 4,784,004 | 11/1988 | Ekola . |
| 4,796,474 | 1/1989 | Koenig . |
| 4,958,525 | 9/1990 | Hauer et al. . |
| 5,020,381 | 6/1991 | Bartlett . |
| 6,122,978 * | 9/2000 | Callendrier ............... 73/862.474 |

FOREIGN PATENT DOCUMENTS

| | | |
|---|---|---|
| 25 20 672 | 5/1975 | (DE) . |
| 24 52 925 | 5/1976 | (DE) . |
| 0 299 806 | 1/1989 | (EP) . |
| 1263182 | 2/1972 | (GB) . |

* cited by examiner

Primary Examiner—Benjamin R. Fuller
Assistant Examiner—Octavia Davis
(74) Attorney, Agent, or Firm—Vickers, Daniels & Young

(57) ABSTRACT

A moving web tension monitoring apparatus of easily fabricated, relatively inexpensive and easily assembled construction comprises a cantilever mounted strain beam element coupled at the flexurable end thereof through a rigid coupling to one end of the support shaft for the web supporting guide roll. A twin beam type transducer having strain gauges at the flex points of the beams is coupled to the shaft supporting the moving web. The strain gauges are located and electrically connected to measure the radial forces applied to the shaft. A shaft coupler connects the shaft to a bearing in the transducer to reduce slippage of the shaft. The transducer is designed to be easily adjusted so that the forces applied to the shaft are accurately detected. The components of the transducer are also adjustable to alter the rigidity and/or resonance frequency of the transducer.

68 Claims, 8 Drawing Sheets

WEB TENSION TRANSDUCER APPARATUS

This invention relates in general to a monitoring apparatus for measuring and indicating the tension in a continuously moving web, and, more particularly, to an apparatus for sensing the tension in moving webs and producing a signal with respect to such tension.

INCORPORATION BY REFERENCE

This invention relates to improvements in the transducer devices described in U.S. Pat. Nos. 4,326,424 Koenig, issued Apr. 27, 1982; 4,674,341 Koenig, issued Jun. 23, 1987; 4,735,102 Koenig, issued Apr. 5, 1988; and 4,796,474 Koenig, issued Jan. 10, 1989; and U.S. patent application Ser. No. 09/053,800 filed Apr. 2, 1998. The disclosures of such patents and patent application are incorporated herein by reference.

BACKGROUND OF THE INVENTION

In web handling processes, wherein a web of flexible material such as a fabric, paper, or metal is continuously passed partly around a guide roll either fixed or rotatably supported on a shaft, it is known to support one or both ends of the shaft by a transducer device capable of measuring the transverse or radial forces exerted on the roll by the tensions in the moving web and then making continuing adjustments to the web tension, responsive to the ongoing web tension measurements, either by manual or automatic control equipment. These known web tension measuring devices customarily include a sensor in the form of a strain beam cantilever mounted on a fixed frame and the flexurable free end of which is coupled to and supports an end of the guide roll shaft through either a thin flexurable steel diaphragm or a pivotal connection such as a self-aligning bearing. Strain gauges are attached to the strain beam and are connected in an electrical circuit to generate a continuous electrical signal. The generated electrical signal caused by the beam deflection due to the web tension forces on the beam are representative of the instantaneous tension in the moving web. Many of these measurement devices are quite sensitive to small force variations, so much so, in fact, that the response curve has an undesirable hysteresis loop therein. This hysteresis was, in part, caused by the friction in the hinged or jointed connection between the axle and the movable, face plate. Thus, as tension on the web increases, the beam bends, resulting in its extended axis, diverging relative to the roller axis, which divergence is taken up by the hinged connection. Undesirable friction in this connection produces a force couple which, as web tension increases, acts to resist the bending of the beam and therefore causes a reduction in the stress applied to the strain gauge and the resultant tension signal. As tension in the web decreases and the beam is unloaded, the friction couple in the hinged connection produces a force couple which acts in the opposite direction and causes an increase in the resultant tension signal. The difference in these signals results in a hysteresis loop in the response curve which makes the sensor unsatisfactory for extremely critical applications.

To overcome these problems, a sensor was introduced which comprised of a pair of parallel spaced arms or beams each integrally connected at one end to the base plate and at the other end to the face plate, which face plate then was connected to the axle of the web roller. As this twin beam sensor was loaded, the extended axis from the face plate remained parallel to the unloaded axis and no force couple was introduced due to the bending of the beams. Accordingly, it was found possible to eliminate the expensive bearing connection and a rigid connection between the shaft and the sensor. Such devices were an improvement, even though, in some instances, a hysteresis loop remained. However, it was found that, particularly when the web roller had a substantial length, the axle of the roller was bent or deflected throughout its length by the web tension forces such that its extended axis was no longer parallel to the extended axis of the face plate. This placed one of the beams in longitudinal tension and the other in longitudinal compression which forces affected the strain gauges in the same manner as bending forces and gave inaccurate results and hysteresis in the response curve. Further, the arrangement had difficulty accommodating these misalignments of the shaft and/or expansions or contractions thereof. Coupling arrangements for the shaft which are disclosed in U.S. Pat. Nos. 4,326,424, 4,674,341 and 4,796,474 to Koenig overcome many of these problems. Although these web tension sensor devices have significantly simplified the fabrication and construction of such devices and have substantially reduced the problems associated with hysteresis, shaft expansion, and roller misalignment, these devices all suffer from shaft mount problems, complex wiring configurations, and are difficult to properly align the transducer to the, forces being applied to the shaft.

Transducer devices which are used to measure large tension forces being applied to a web roller are modified to increase the rigidity of the transducer components. Generally, the flexure beam arrangement includes thicker and heavier components to accommodate the large forces. The transducer also typically includes one or more stop pins to prevent damage to the flexure beam components. The increased weight of these components can adversely affect the resonance frequency of the transducer thereby causing inaccurate readings. The use of stop pins in the transducer increases the complexity of operation, limits the range of operation, and increases the cost of the transducer.

SUMMARY OF THE INVENTION

The present invention contemplates a new and improved moving web tension sensor and transducer device which overcomes the above referred to problems and others and provides a web tension arrangement for more accurately monitoring and measuring the web tension as the web passes over the load shaft. The web tension arrangement provides a web tension monitoring and measuring device having a comparatively simple and easily fabricated and assembled construction, and having relatively low hysteresis, reduced resonance effects, easier alignment, and having the ability to accommodate multiple types of shafts.

In accordance with the present invention, a strain beam sensor arrangement for a web roller in a web tension machine is provided comprised of a transducer having a base plate adapted to be secured to the frame of the web handling apparatus and a movable plate supporting the axle of the web roller. The transducer includes strain gauges that are connected in an electrical circuit to measure the radial forces applied to the axle of the web roller as the web passes over the web roller.

In accordance with another aspect of the present invention, the transducer is a twin beam-type transducer device which includes a pair of extending spaced beam elements or arms. The spaced pair of strain beam elements are preferably symmetrically oriented about the axis of the web roller. In one specific embodiment, the strain beam elements are of a mirror reflection of one another. In another specific embodiment, the beam elements are positioned generally parallel to one another. In yet another specific embodiment, the beam elements are symmetrically oriented about the longitudinal axis of the web roller.

In accordance with still another aspect of the invention, the strain beam of the transducer device includes at least one sensor for measuring the strain on the beam element. Preferably, the beam element includes two sensors. For a twin beam transducer, the sensors can be positioned on one or both of the strain beams. In one specific embodiment, both strain beams include two sensors. In another specific embodiment, the sensors are positioned on the inner sides of the two strain beams to facilitate simpler wiring of the sensors to the monitor and to reduce interference of the wires with other components of the transducer.

In accordance with another aspect of the present invention, the transducer device includes a self-aligning bearing which rotatably supports one end of the shaft of the web roller. The self-aligning bearing is preferably used when large loads are applied to the web roller. In one specific embodiment, the self-aligning bearing is a ball type bearing having one or a double row of ball bearings and an outer race with a spherically dished bearing surface which is fitted on the shaft or a collar adaptor. In another specific embodiment, the roller bearing elements of the self-aligning bearing is barrel shaped, i.e. convexially contoured or synclastic roller that is rotatable between inner and outer races which have bearing services of a spherically disk shape and which conform to the convex contour of the barrel shaped rollers. The use of the barrel shaped rolling elements enable the transducer device to be used in high load capacity environments.

In accordance with yet another aspect of the present invention, the self-aligning bearing is isolated within a grease-containing compartment portion of the bore. Grease seals are preferably fitted within the bore on each side of the bearing and engaged with the opposite side faces of the inner bearing or race thereof. A grease introducing opening which extends through the side of the transducer and communicates with a tube which in turn communicates with the bearing containing compartment portion thereof located between the grease seals is provided to supply grease to the bearing. The tube is preferably flexible to accommodate movement or adjustment of the components of the transducer.

In accordance with still another aspect of the present invention, the transducer device includes a collar adaptor designed to secure one end of the shaft of the web roller to a bearing. Preferably, the collar adaptor includes a shaft cavity designed to telescopically receive a portion of the shaft end and to rigidly secure the shaft end therein. The shaft end can be secured into the shaft cavity of the collar adaptor by a variety of mechanisms such as by screws, bolts, adhesives and the like and/or the end of the shaft can be threaded into the end of the shaft cavity. The other end of the collar adaptor is designed to frictionally engage the collar cavity of the bearing so as to reduce slippage within the collar cavity as the web passes over the web roller. The reduction or elimination of slippage of the collar adaptor within the bearing reduces error in tension measurements by the transducer. The use of the collar adaptor enables a wide variety of shaft sizes to be easily secured to the transducer without sacrificing the measurement accuracy of the transducer.

In accordance with still yet another aspect of the present invention, the transducer includes a face plate and/or a back plate which rotatably secures the flexure beam arrangement. Preferably, the flexure beam arrangement is designed to at least partially rotate within the body of the transducer device when the flexure beam arrangement is not rotatably secured to the front and/or back plate. The at least partially rotatable movement of the flexure beam arrangement within the transducer device allows for easy and more accurate alignment of the flexure beam arrangement to the tension forces being applied to the web roller thereby facilitating in accurate measurements of the tension on the web roller as the web passes over the web roller. Once the flexure beam arrangement is properly oriented, the front and/or back plate are secured to the flexure beam arrangement in such a manner to inhibit further rotation of the flexure beam arrangement within the body of the transducer device. Preferably, the transducer device includes a face plate which frictionally engages a portion of the flexure beam arrangement thereby preventing rotation of the flexure beam within the body of the transmitter device. In another preferred arrangement, the transducer device includes a front and back plate which both frictionally engage the flexure beam arrangement to prevent the flexure beam arrangement from rotating within the transducer device. The front and/or back plate of the transducer device preferably are moved into frictional engagement with the flexure beam arrangement by the use of screws, bolts, or the like. The surface of the flexure beam arrangement and/or the front and/or back plate can include ridges or other types of surface areas to increase the frictional engagement between such parts.

In accordance with yet another aspect of the present invention, the flexure beam arrangement includes at least one slot which enables the flexure beam arrangement to at least partially rotate within the body of the transducer device when the front and/or back plate are not frictionally engaging the flexure beam arrangement. Preferably, the slots are designed to facilitate in guiding the movement of the flexure beam arrangement within the body of the transducer device.

In accordance with a further aspect of the present invention, the flexure beam arrangement includes at least one rigidity structure designed to alter the resonance frequency of the flexure and beam arrangement and transducer device and to provide rigidity to the flexure beam arrangement. As the web passes over the web roller, vibrations are introduced into the transducer device. When the vibrations are the same as or near the resonance frequency of the components of the transducer device, severe vibrations within the transducer device can occur thereby resulting in inaccurate readings of the tension on the web roller. The rigidity of the flexure beam arrangement is designed to be adjustable thereby allowing for alterations in the resonance frequency of the flexure beam arrangement so as to avoid severe vibrational frequencies caused by the web passing over the web roller. Preferably, the flexure beam arrangement includes at least one rigidity beam to increase the rigidity of the flexure beam arrangement. The increased rigidity provided by the rigidity beam enables the transducer to be used in systems having greater tensions applied to the web roller. Preferably, the rigidity beam is designed such that the rigidity provided by the rigidity beam is adjustable. In one specific embodiment, the rigidity provided by the rigidity beam can be reduced to alter the resonance frequency of the flexure beam arrangement and the transducer device. Preferably, the thickness of the rigidity beam can be altered to reduce the rigidity thus alter the resonance frequency of the flexure beam means and the transducer device.

In accordance with a further aspect of the present invention, a rigid coupling, which does not include bearings, secures the shaft of the web roller to the flexurable end of the strain beam means.

The principal object of the present invention is to provide a new and improved web tension measuring device which is of a comparatively simple form composed of a minimum number of easily and economically fabricated component parts which are easy to assemble and disassemble, which device can measure radial forces applied to a shaft of a variety of web rollers.

Another object of the present invention is to provide an ultra low profile transducer for applications where width is an issue.

Another object of the present invention is to provide a web tension measuring device which can accurately measure radial forces applied to a shaft of a web roller.

Still another object of the present invention is to provide a web tension measuring device having a novel form of strain beam construction of the twin beam type which strain beam is easy and inexpensive to fabricate.

A still further object of the present invention is to provide a transducer device having one or more rigidity beams to increase the rigidity of the flexure beam arrangement and eliminate the need for stop pins.

Another object of the present invention is to provide a web tension measuring device which has an adjustable resonance frequency.

Still another object of the present invention is to provide a web tension measuring device which can accommodate a variety of roller shaft designs.

Still yet another object of the present invention is to provide a web tension measuring device which is capable of accommodating large amounts of shaft misalignment without seriously affecting the accuracy of the web tension measurements.

A further object of the present invention is to provide a web tension measuring device having a self-aligning roller bearing arrangement to support a shaft on a flexure of the strain beam arrangement and having a self-lubricating mechanism to minimize hysteresis that is normally introduced in such bearings.

Still another object of the present invention is to provide a web tension measuring device which transducer arrangement can be easily adjusted and aligned to provide increased accuracy of tension measurements on the support shafts.

Another object of the present invention is to provide a web tension measuring device which has a simple wiring arrangement.

Further objects and advantages of the invention will be apparent from the following detailed description of a preferred species thereof and from the accompanied drawings.

BRIEF DESCRIPTION OF THE DRAWINGS

The invention may take the physical form in certain parts and an arrangement of parts, a preferred embodiment of which will be described in detail in this specification and illustrated in the accompanied drawings which form a part hereof and wherein.

DESCRIPTION OF THE PREFERRED EMBODIMENT

Figure 1:
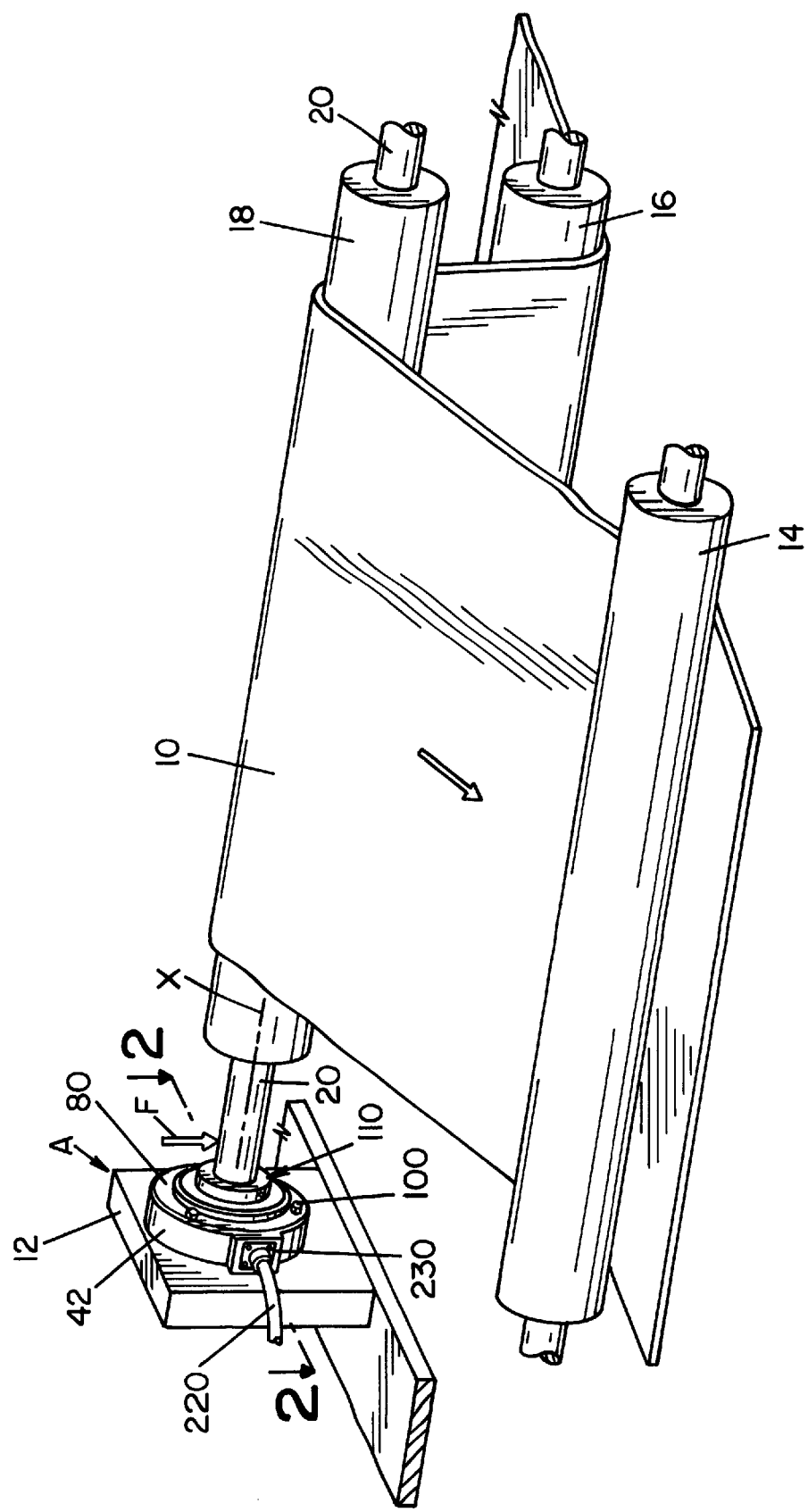
FIG. 1 is a fragmentary perspective view of the general arrangement of a system for monitoring the tension in a moving web.

Referring now to the drawings wherein the showings are for the purposes of illustrating a preferred embodiment of the invention only and not for the purpose of limiting same, FIG. 1 illustrates a web 10 continuously moving lengthwise through a web handling apparatus comprised of a frame 12, a pair of spaced parallel idler rollers 14, 16 extending horizontally, for example, generally in a common horizontal plane, and a web tensioning guide roller or web roller 18 extending generally parallel to and located between but displaced from, e.g., above, the plane of the two idler rollers 14, 16, by an amount such that the web 10, as it moves over the web roller 18, is displaced from its normal line of movement, as shown by force arrow F, generally parallel to the plane of the idler rollers 14, 16 and wraps partly around the web roller 18. The tension in the web 10 thus exerts a force F generally downwardly against the web roller 18 which is located somewhere between the two idler rollers 14, 16, the direction of which force depends upon the angle subtended by the web as it passes over the web tensioning web roller 18. Thus, when the web roller 18 is located generally midway between the two idler rollers 14, 16, the force exerted by the tensioned web against the web roller 18 is then directed generally vertically downward there against. The web handling apparatus is conventional and is shown schematically with only those parts thereof pertinent to the present invention being shown.

The web roller 18 is supported at its opposite ends on a horizontally extending parallel support shaft 20, or it may be rotatably mounted on the support shaft by ball bearings (not shown). Shaft 20 extends transversely between the side frame portions 12 of the apparatus, and the ends of the shaft are supported relative to the side frame portions 12 by means of respective identical force sensing means transducer device A & B (only A is shown) in a manner in accordance with the present invention. As can be appreciated, a single force sensing means or transducer can be used to measure the forces on the shaft.

Figure 2:
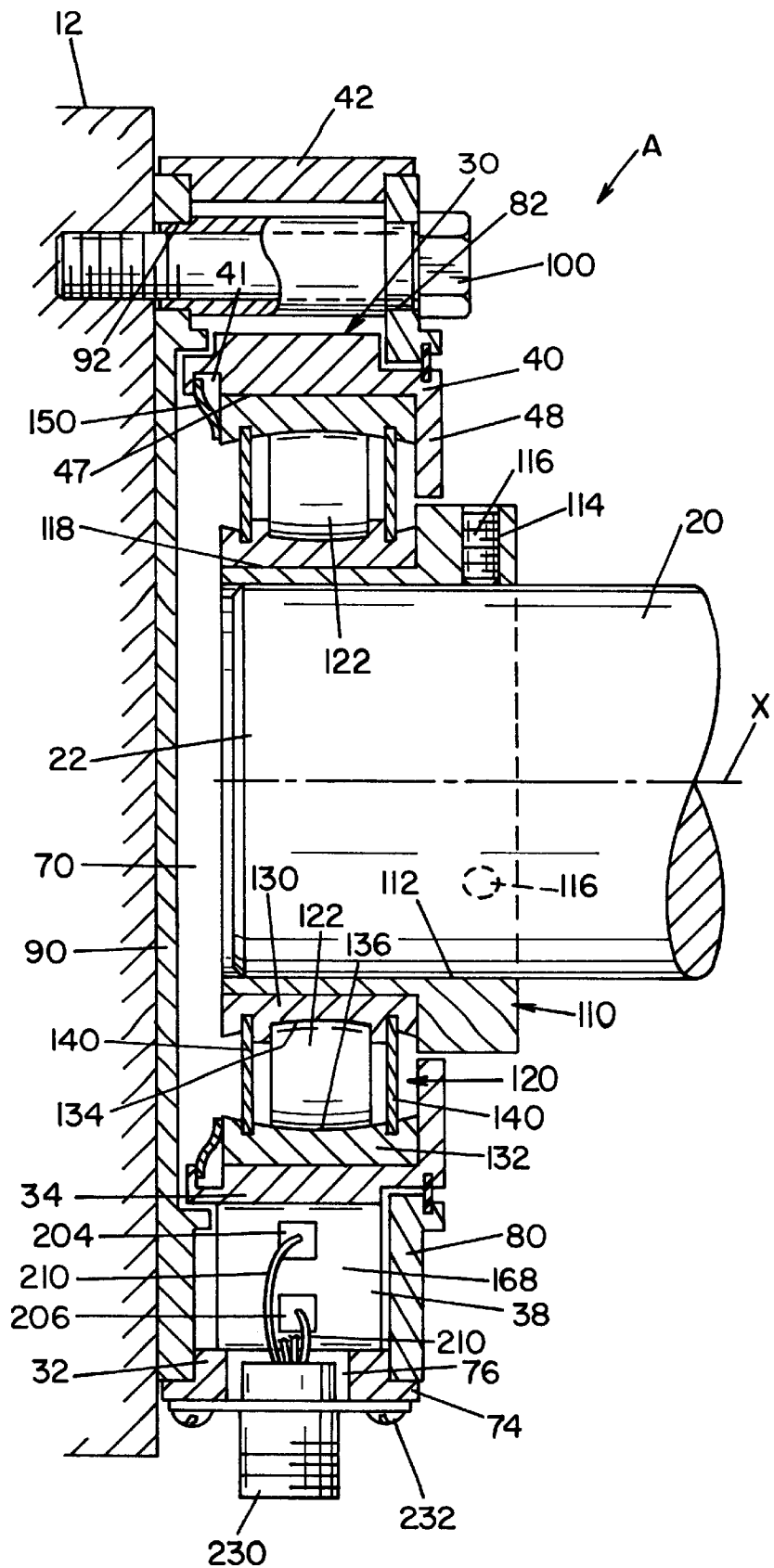
FIG. 2 is an enlarged fragmentary horizontal sectional view of one end of the web tension measuring apparatus taken along line 2—2 of FIG. 1 and showing in detail a preferred embodiment of a twin beam sensor in its normal state with no web tension forces imposed thereon.
Figure 3:
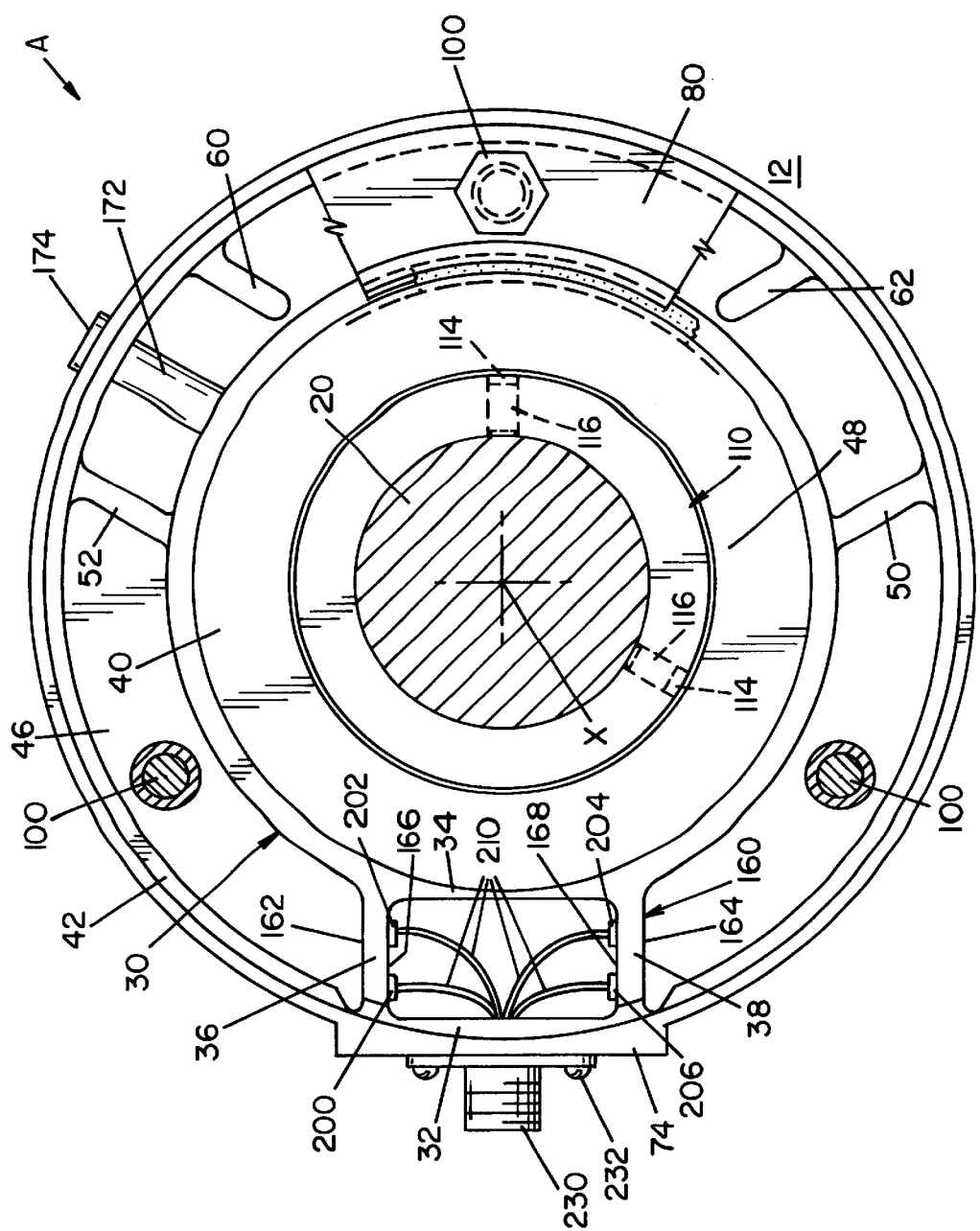
FIG. 3 is a front elevation view of the transducer device of the present invention with the majority of the front face plate removed.

In the embodiment shown in FIGS. 2 and 3, transducer A comprises a sensor beam member 30 formed of a resilient material such as metal. The sensor beam member 30 includes a base plate 32 and end plate 34 which are joined together and held in spaced, parallel, coaxial relationship disposed transversely of shaft 20 by a pair of spaced, parallel arms 36 and 38 forming flat strain beam portions or elements. The arms 36, 38 are generally plate-shaped and disposed flatwise of and parallel to and laterally spaced apart, e.g., vertically spaced, on opposite sides of and preferably equidistant from the axis X of shaft 20 in the unloaded condition thereof. Arms 36, 38 are fastened at their respective ends to plates 32, 34 by any suitable means; e.g., welding, bolting, screwing, or integral as shown. Referring to FIG. 3, end plate 34 includes a cup-shaped end receptacle 40 which is designed to receive bearing 120. Preferably bearing 120 is a self-aligning bearing, especially when large loads are to be applied to web roller 18 by web 10. Base plate 32 includes a cylindrically shaped base shell 42 which is spaced from and encircles the outer perimeter of receptacle 40 thereby forming a slot 46 between receptacle 40 and base shell 42. At spaced locations about receptacle 40, there are rigidity beams 50, 52 which interconnect receptacle 40 to base shell 42. Slot bars 60, 62 are connected to the inner surface of base shell 42 and extend toward, but do not contact, the outer surface of receptacle 40.

Figure 5:
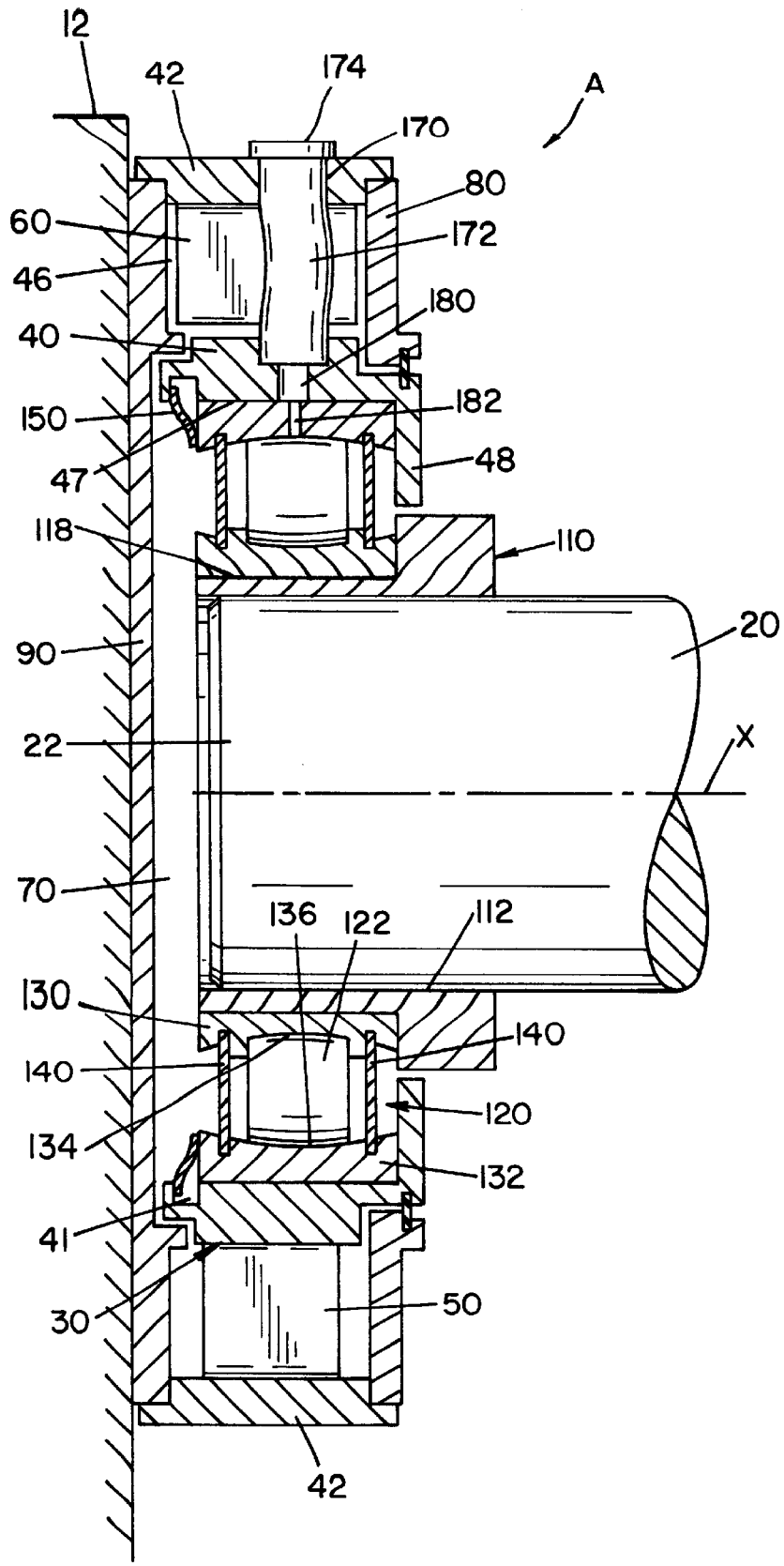
FIG. 5 is an enlarged fragmentary vertical sectional view of one end of the web tension measuring apparatus showing in detail a preferred embodiment of a twin beam sensor and a bearing lubricator.
Figure 6:
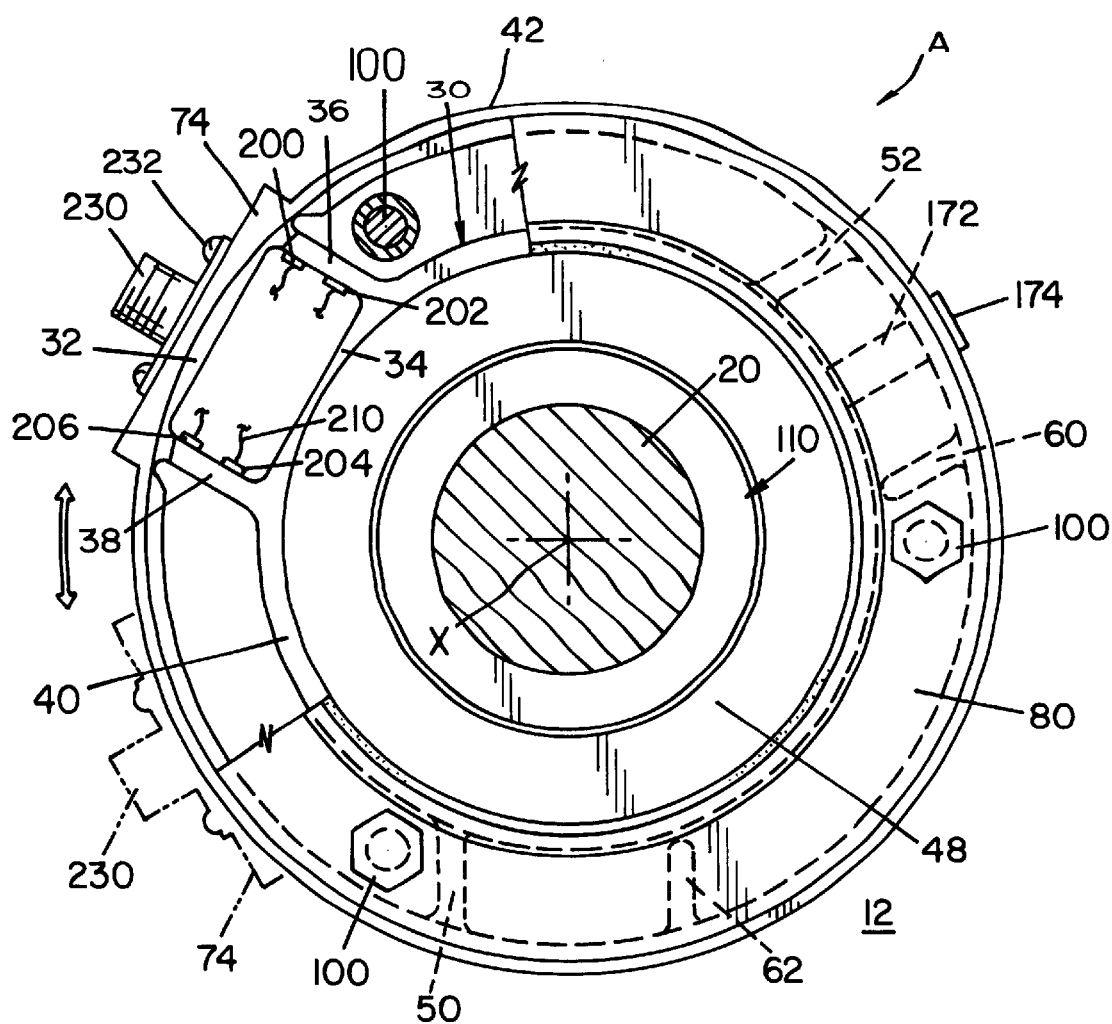
FIG. 6 is a front elevation view of the transducer device without a face plate and illustrating the twin beam sensor rotatably positioned within the body of the transducer device.

The sensor beam member 30, integral with base shell 42, is rotatably positioned on frame 12 and forms chamber 70 as shown in FIGS. 2 and 5.

The sides of base shell 42 are covered by a circular front plate 80 and a back plate 90. Front plate 80, back plate 90 and base shell 42 are mounted on frame 12 of the apparatus by bolts 100. Front plate 80 includes a bolt opening 82 and back plate 90 includes a bolt opening 92. The body of bolts 100 are designed to pass through bolt opening 82 of front plate 80, through slot 46 between receptacle 40 and base shell 42, through bolt opening 92 of back plate 90 and into frame 12 as shown in FIG. 2.

Sensor beam member 30, integral with base shell 42, is mounted between front plate 80 and back plate 90 so that arms 36, 38 are disposed flatwise in respective horizontal planes which extend parallel to and on opposite sides of the axis X of shaft 20 in the unloaded condition thereof, and which planes are disposed normally in the direction of the forces imposed on the web roller 18 and its support shaft 20 due to the tension in the moving web 10. Thus, where these web tension forces are to be directed vertically downward against the web roller 18, sensor beam member 30 is positioned on the frame 12 with arms 36, 38 of the sensor beam member 30 disposed flatwise in approximately parallel horizontal planes.

Figure 4:
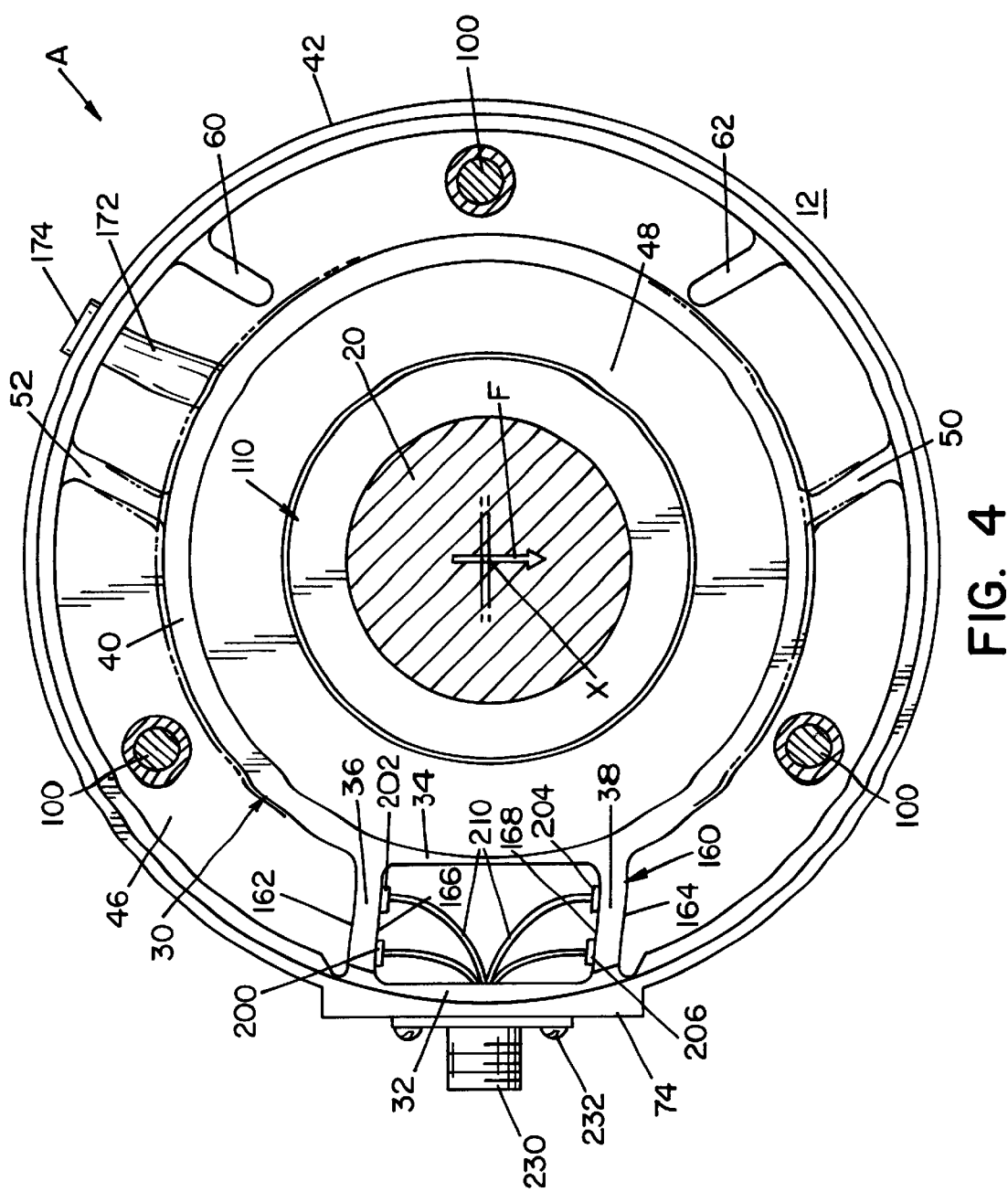
FIG. 4 is a front elevation view of the transducer as shown in FIG. 3 wherein web tension forces are being applied to the shaft.

As shown in FIGS. 3 and 4, arms 36, 38 are cantilever mounted at their anchor ends on base plate 32 so that their other ends are free to bend or deflect downwardly when forces are imposed on end plate 34 by the downward forces imposed on web roll shaft 20 due to the tension in the web 10. As the downward force on movable end plate 34 increases as shown in FIG. 4, the upper surfaces of arms 36, 38 adjacent base plate 32 are in a state of increasing tension while the opposite or lower surfaces adjacent base plate 32 are in a state of increasing compression. Conversely, as the downward force on end plate 34 decrease, the upper surfaces of arms 36, 38 are in a state of decreasing tension while the lower surfaces are in a state of decreasing compression.

As shown particularly in FIG. 3, receptacle 40 is spaced from slot bars 60, 62 so as to provide a slight clearance therebetween as indicated for permitting a limited amount of downward and upward deflection movement of arms 36, 38 by the web tension forces applied to the shaft 20. The ends of slot bars 60, 62 thus serve as a positive mechanical stop during the operation of the apparatus for engaging with the periphery of receptacle 40 of the sensor beam member 30 to prevent excessive downward or upward deflection and any resulting overload of arms 36, 38 thereof.

Referring now to FIG. 2, the end 22 of shaft 20 is coupled to a shaft coupler 110. Shaft coupler 110 includes a cup-shaped cavity 112 which telescopically receives end 22 of shaft 20. Shaft coupler 110 includes mount holes 114 which receive pins 116. Pins 116 preferably are designed to be threaded in mount hole 114 and engage the outer surface of shaft 20 thereby rigidly securing shaft 20 to shaft coupler 110. The cavity and pin arrangement of shaft coupler 110 is designed to rigidly secure a wide range of diameter sizes of shafts, thus making shaft mounting easier, and reducing shaft slippage due to various shaft diameters. This arrangement for locking the end of shaft 20 to shaft coupler 110 enables easy coupling and assembly of shaft 20 with the sensor beam member 30 of the transducer device. Shaft coupler 110 is coupled to and supported in place on the movable end of the sensor beam member 30. Specifically, shaft coupler 110 is press-fitted and/or frictionally mounted in cup-shaped receptacle 40 by a self-aligning bearing 120 fitted within the receptacle 40. The shaft 20 thereby is rotatably supported on the sensor beam member 30 by a self-aligning bearing 120 which then allows for minor misalignment of the transducer and/or bending of the guide roll shaft 20 by the load imposed thereon.

Referring now to FIGS. 2 and 5, the self-aligning bearing 120 preferably is, as shown, of the roller bearing type having rolling elements 122 of barrel shaped, i.e., convexly contoured or synclastic, which are rotatable between inner and outer races 130, 132 respectively, with bearing surfaces 134 and 136 of a spherically dished shape conforming to the convex contour of the barrel shaped rolling element 122. The use of such a self-aligning bearing 120 for journaling the shaft 20 on sensor beam member 30 of the transducer device affords a high load capacity to the device. The self-aligning bearing 120 is provided with built-in annular grease seals 140 which are located on each side of the bearing roller elements 122 and close off the space between the inner and outer races 130, 132 at each side thereof to form therewith a grease tight chamber containing lubricating grease and within which the rolling elements 122 are confined. The grease seals 140 are fitted in annular grooves in the bearing surfaces 134, 136 of the inner and outer races 130, 132 to hold them in place in bearing 120. Outer race 132 of bearing 120 has an axially slidable fit in the inner surface 47 of the cup-shaped receptacle 40 of the sensor beam member 30, and it is retained in place therein by a retainer flange 48. A spring washer 150 preferably of a wave shape type is slidably fitted in receptacle 40 and interposed in a biased position in a washer slot 41 of receptacle 40. The spring washer 150 causes the axial facing side of outer race 132 of the self-aligning bearing 120 to constantly urge the bearing 120 toward axially abutting engagement with the retainer flange 48. The yieldability of the spring washer 150 permits the bearing 120 to slide in inner surface 47 of receptacle 40 in an axial direction away from the retainer flange 48 to accommodate lengthwise expansion of the guide roll support shaft 20 caused by a temperature rise therein during the operation of the web tension measuring device.

Figure 8:
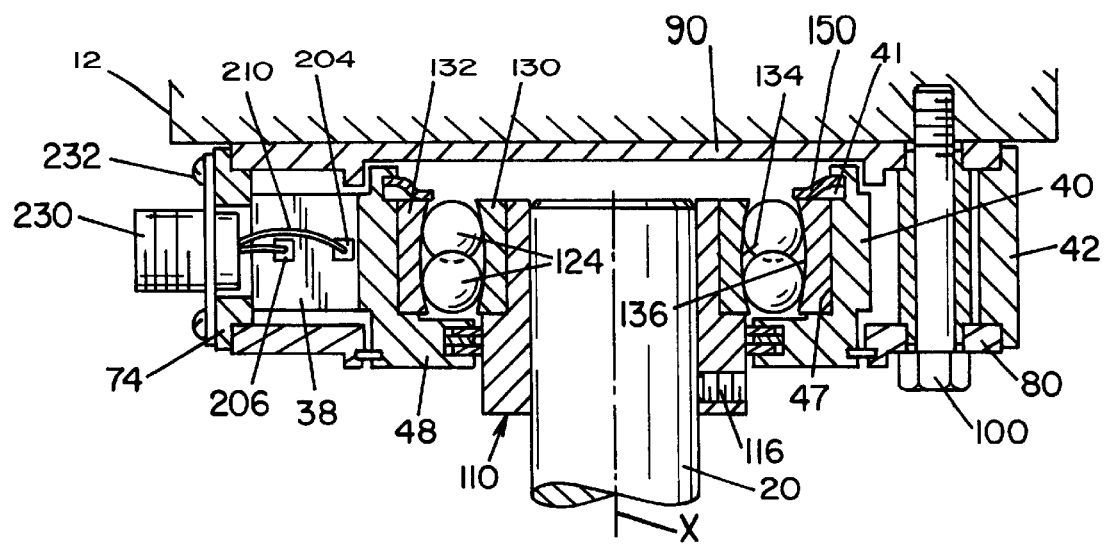
FIG. 8 is a enlarged cross-sectional side view of the transducer device showing the shaft coupled to an alternative type of self-aligning bearing; and, FIG. 9 is a front elevational view of the transducer device illustrating an alternate design of the rigidity beams.

Referring now to FIG. 8, an alternative design of the self-aligning bearing 120 is shown. The self-aligning bearing 120 is of the ball bearing type and having a double row of ball bearings 124 rotatable between an inner race 130 and an outer race 132 preferably having a bearing surface, 134, 136 of a spherically dished shape. The inner race 130 is fitted on shaft coupler 110, preferably by a press fit and/or frictional engagement. Outer race 132 has an axially sliding fit in the inner surface 47 and is retained in place therein by a retainer ring 150 removably secured within the receptacle 40 of sensor beam 30. The retainer ring 150 is preferably in the form of a snap ring which is snap locked into an annular groove 41 in the wall of cup shaped receptacle 40 for easy removal therefrom to permit easy disassembly of bearing 120 should it be necessary for some reason or other to replace the bearing.

A spring washer 150, preferably of a waveshape type, is slidably fitted in receptacle 40, and interposed in biased position is a washer slot 41 of receptacle 40. The spring washer 150 causes the axial facing side of outer race 132 of the self-aligning bearing 120 to constantly urge bearing 120 toward axially abutting engagement with retainer flange 48 of sensor beam 30. The yieldability of the spring washer 150 permits bearing 120 to slide in inner surface 47 of receptacle 40 in an axial direction away from retainer flange 48 to accommodate lengthwise expansion of shaft 20 caused by a temperature rise therein during the operation of the web tension measuring apparatus. Two grease seals 140 are fitted in annular grooves in inner race 130 and outer race 132 to hold them in place in bearing 120.

The shaft coupler 110 comprises a circular mount portion 118 of a diameter generally conforming to the inner diameter of inner race 130. Shaft coupler 110 is fixably secured to inner race 130 by press fitting and/or by frictional engagement thereby preventing rotation of shaft coupler 110 in inner race 130. As can be appreciated, other or additional means can be used to connect shaft coupler 110 to inner race 130 such as pins, bolt and the like.

The sensor beam member 30 may be formed with the vertically spaced pair of parallel arms 36 and 38 in a novel, easily accomplished manner which eliminates relatively expensive machining operations. Thus, the particular sensor beam member 30 can be formed from a body member of a suitable metallic material such as aluminum, and having a bridge section 160 of rectangular transverse cross-section bridging a base plate 32 and a movable end plate 34. The bridge section 160 is provided parallel outer upper and lower surfaces 162, 164 which ultimately form, respectively, the top surface of arm 36 and the bottom surface of arm 38. Bridge section 160 is also provided with inner upper and lower surfaces 166, 168 which ultimately form, respectively, the bottom surface of arm 36 and the upper surface of arm 38.

The sensor beam member 30 is provided with means for lubricating the bearing surfaces between the self-aligning bearing 120 in order to reduce friction between rolling elements 122 and inner and outer race 130, 132. As illustrated in FIG. 5, lubricating grease is introduced between inner and outer race 130, 132 through a lubricating arrangement which includes a lubricating tube 172 having a tube opening 174. Lubricating tube 172 extends trough lubricating opening 170 in base shell 42 and transverses slot 46 to a grease opening 180 in receptacle 40. Grease opening 180 extends through receptacle 40 and to a corresponding opening 182 in outer race 132. Lubricating tube 172 is a flexible tube to enable movement between sensor beam 30 and base shell 42. A grease fitting is inserted into opening 174 to close it off from the outside after the introduction of lubricating grease.

In the embodiment of the invention shown, arms 36, 38 form twin support beams for supporting the movable end plate 34 of the sensor beam member 30 relative to the base plate 32 thereof, and at the same time form a resilient flexurable beam means allowing the end plate 34 of the sensor beam member 30 to move downwardly parallel relative to the base plate 32, and in a direction transversely of the shaft axis X, due to forces imposed on the web roller 18 and associated shaft 20 by the tensions in the continuously moving web 10. The web 10 imposes a vertical force downwardly in the vertical axial plane of the shaft 20 which force is applied by the shaft to end plate 34 through the self-aligning bearing 120, and this force then causes arms 36, 38 to bend in like, slightly S-shaped manner, as shown in FIG. 4. Because arms 36, 38 are spaced apart, the movable end plate 34 of the sensor beam member 30, as it moves vertically in a direction transverse to the shaft axis, is held by the arms 36, 38 in parallel relationship with the base plate 32. The forces applied to the sensor beam member 30 are such as never to stress arms 36, 38 beyond their elastic limit so that they always function as a perfect cantilever spring, and end plate 34 will move in linear relationship to the forces applied thereto.

Referring to FIGS. 3, 4, 6, and 7, the deflection of arms 36, 38 is reduced by rigidity beams 50, 52. Rigidity beams 50, 52 add structural rigidity to sensor beam member 30 and resist movement of receptacle 40 when tension is being applied to web roller 18 by web 10. The reduced movement of receptacle 40 results in reduced flexure of arms 36, 38. Due to the increased rigidity supplied by the rigidity beams 50, 52, the sensor beam member 30 can be used to measure much greater web tensions without the need to increase the bulk of the sensor beam member 30. As shown in FIG. 4, arms 36, 38 and rigidity beams 50, 52 flexure when force F is applied to shaft 20. In operations where force F is greater than the operational parameters of sensor beam member 30, receptacle 40 is deflected until contacting slot bars 60, 62. Slot bars 60, 62 prevent over-deflection of receptacle 40 to prevent damage to arms 36, 38 and rigidity beams 50, 52. I operations wherein the force F on receptacle 40 does not sufficiently deflect receptacle 40, the rigidity provided by rigidity beams 50, 52 can be reduced by shaving or grinding the sides of the rigidity beams 50, 52. As a result, the rigidity of the sensor beam member 30 can be easily customized for a particular operation. The rigidity beams 50, 52 can also be used to alter the resonance frequency of the transducer by decreasing the rigidity provided by the rigidity beams 50, 52.

Figure 9:
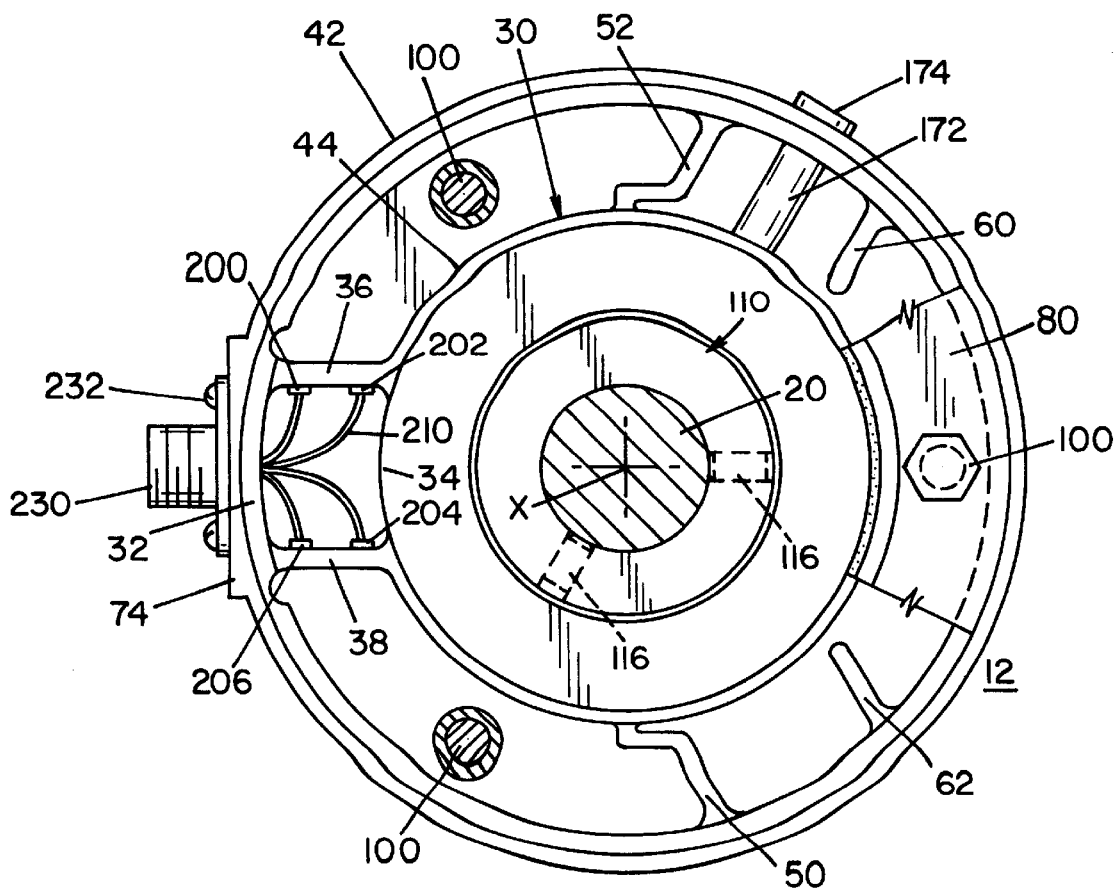

Referring to FIG. 9, an alternate configuration of the rigidity beams 50, 52 is illustrated. As can be appreciated, a wide variety of rigidity beam configurations can be used to provide various levels of rigidity to the sensor beam member 30.

Sensor beam member 30 can be rotated in relation to frame 12 to orient arms 36, 38 normal to the force being applied to web roller 18. Once the closest of the three bolt combinations has been selected, the transducer can be rotated up to 60° to get the exact orientation. To rotate sensor beam member 30, bolts 100 are loosened. Sensor beam member 30 is then rotated until the desired orientation is obtained. After the sensor beam member 30 has been oriented, the bolts are tightened to rigidly and non-rotatably secure sensor beam member 30 between front plate 80 and back plate 90. This orientation arrangement eliminates the need to redrill holes in frame 12 to properly orient the sensor beam member 30 as was required in past transducers.

Referring to FIG. 3, arms 36, 38 of the sensor beam member 30 of transducers A and B are subjected to and deflected by the tension forces of the moving web 10. To measure these tension and compressive strains in arms 36, 38, conventional type strain gauges 200, 202, 204, 206 are respectively mounted on lower surface 166 of the upper arm 36 and upper surface 168 of the lower arm 38. These areas of the arms are the points of maximum flexure thereof due to the forces exerted thereon by the moving web 10. Thus, as viewed in FIG. 4, strain gauges 202, 206 are in a state of bending tension while strain gauges 200, 204 are in a state of bending compression. The resistance of these gauges always varies in opposite directions. The same condition would exist in the other sensing means B (not shown) at the opposite end of the support shaft 20, where strain gauges corresponding to gauges 200, 202, 204, 206 respectively, are similarly mounted on the strain beam arm 36, 38 of transducer B.

The strain gauges 200, 202, 204, 206 are connected to a monitoring device (not shown) by wires 210. As illustrated in FIGS. 3, 4, 6, 7, and 9, the strain gauges 200, 202, 204, 206 are mounted on surfaces 166 and 168 so as to easily route wires 210 from the transducer to a monitoring device.

Figure 7:
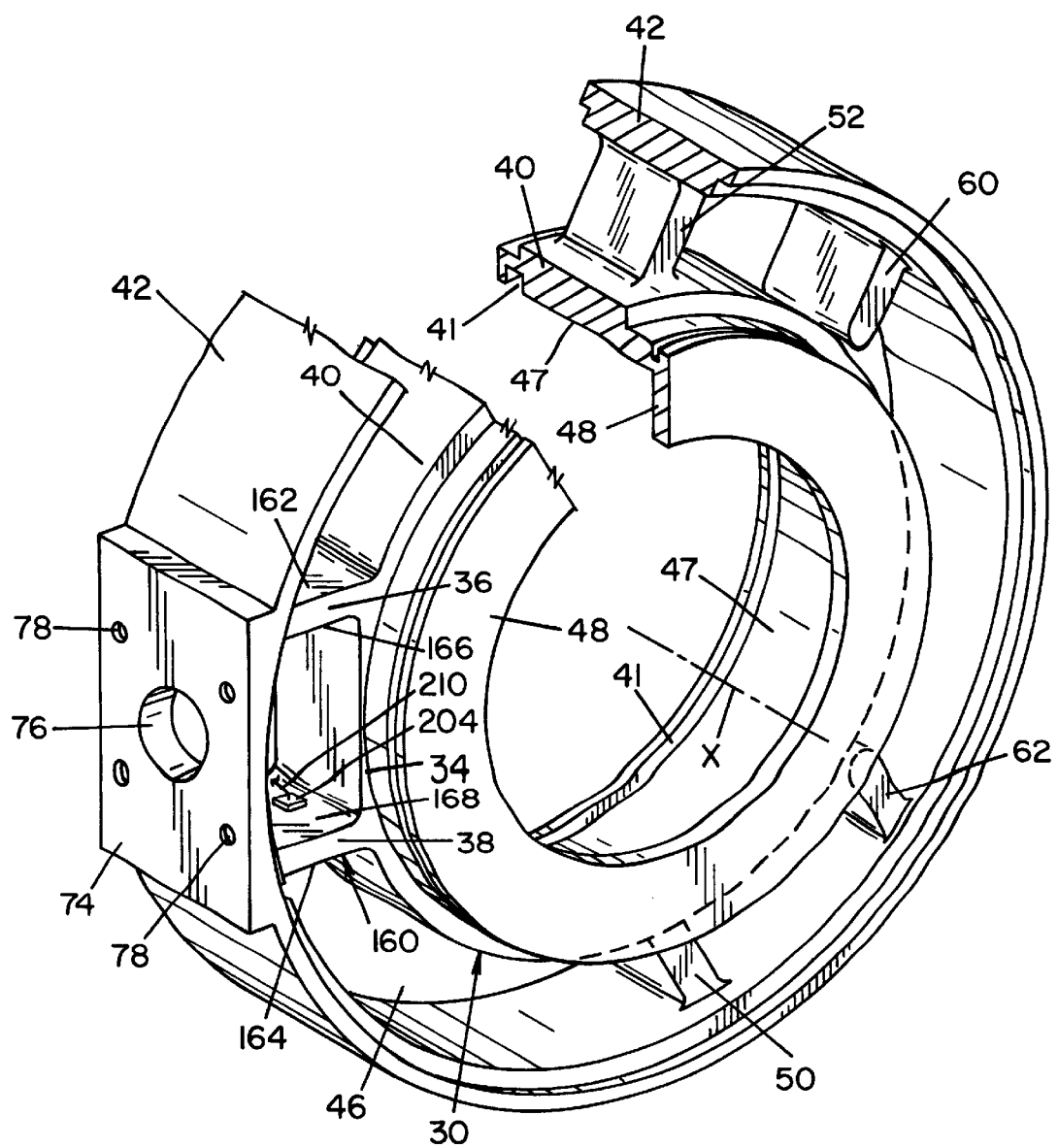
FIG. 7 is an enlarged prospective view of the transducer device showing parts broken away and illustrating the device without the bearing positioned therein.

Wires 210 are thus simply routed out of base shell 42, thus alleviating complex wiring of the strain gauges which could result in the wires interfering with one or more components of the transducer. As best shown in FIG. 7, base shell 42 includes a housing base 74 having an opening 76 to allow wires 210 to pass through strain gauges 200, 202, 204, 206. A wire cable 220 which contains wires 210 is secured to the housing base 74 by a cable coupler 230. Cable coupler 230 is secured to housing base 74 by screws or bolts 232 which are inserted through openings in cable coupler 230 and secured in bolt holes 78 in housing base 74.

The strain gauges 200, 202, 204, 206 are connected in a Wheatstone bridge circuit (not shown) in such a manner that as the resistances of strain gauges 200, 202, 204, 206 increase under the bending stress and the resistance of gauges decrease under the bending stress, an indication will be given on a meter or monitor connected between two opposite points of the bridge circuit. This bridge circuit is electrically energized at the diagonally opposed other points thereof from a suitable AC or DC power source. Electrical amplifying means may be substituted for the meter to provide an electrical signal for controlling servo motors or the like for adjusting the web tension.

Instead of employing a sensor beam member 30 of the twin beam-type having a pair of parallel arms 36, 38, a web tension measuring apparatus according to the invention may be provided, if desired, with a sensor beam member 30 having only a single strain beam such as shown and described in U.S. Pat. No. 4,674,341 and provided with strain gauges 200, 202, 204, 206 in the manner as therein shown.

From the above description, it will be evident that a web tension sensing and measuring apparatus or transducer is provided by the present invention which is of simple construction comprised of component parts which are easy and inexpensive to fabricate and do not require critical manufacturing operations and which are easy to assemble and disassemble, as for replacement of a failed self-aligning bearing.

The web tension measuring device according to the invention, moreover, and particularly in view of its preferred twin beam type sensor beam member 30 and its self lubricating means for the self-aligning bearing 120, is characterized by exceptionally low hysteresis in its electrical response curve such as renders the device eminently suitable for use not only in most ordinary service applications but also for those which require extremely critical force measurements, and it provides accurate web tension measurements over an extended period of service time. In addition, the tension measuring device as disclosed herein is capable of readily accommodating, without any adverse effect, any normal misalignment of the axis of the web roller support shaft relative to the common axis of the self-aligning bearing 120 and the sensor beam member 30 such as might occur in the initial assembly and installation of the device or due to the shaft bending under the forces imparted thereto by the web tension. Also, because the outer race 132 of the bearing 120 is axially slidable to a limited extent, the device therefore is capable of taking up all normal web roller shaft length expansion or contradiction due to temperature changes therein or otherwise during use. Furthermore, the transducer as disclosed herein is capable of being easily adjusted so that arms 36, 38 can be accurately oriented normal to the web tension forces being applied by the web 10 to the web roller 18. As a result, more accurate measurements of the web tensions are obtainable. The transducer device also includes special strain gauge wiring 210 and lubrication arrangements to facilitate in the simple orientation of arms 36, 38. In addition, the transducer device includes rigidity beams 50, 52 to increase the structural rigidity of the sensor beam member 30, thus enabling the transducer to be used in high tension operations. The rigidity of the rigidity beams 50, 52 can be adjusted to decrease the rigidity of the sensor beam member 30 to allow the transducer to be customized for various levels of tension operations. The rigidity beams 50, 52 can also be used to adjust the resonance frequency of the transducer thereby reducing adverse tension readings.

The invention has been described in connection with a preferred embodiment and certain modifications thereof. Obviously, further modifications and alterations will occur to others upon a reading and understanding of this specification and it is my intention to include all such modifications and alterations insofar as they come within the scope of the present invention.

I claim:

1. A transducer device to connect to one end of a shaft that at least partially supports a web having a support frame including flexure beam means cantilever supported at one end on said frame and extending toward said shaft, strain gauge means mounted on said flexure beam means to create a signal indicative of flexure of said beam means, a bearing rotatively supporting said one end of said shaft, and a collar adaptor releasably secured to said one end of said shaft, said bearing having a collar cavity to frictionally and non-rotatably receive one end of said collar adaptor, said flexure beam means including at least one support beam oriented about a longitudinal axis of said shaft, said strain gauge means including at least two gauges, said strain gauge means being electrically connected to a circuit to measure radial forces applied to said shaft.

2. The transducer device as defined in claim 1, wherein said flexure beam means has two support beams positioned substantially parallel to one another.

3. The transducer device as defined in claim 1, wherein said flexure beam means has two support beams positioned substantially symmetrically about said axis of said shaft.

4. The transducer device as defined in claim 2, wherein said flexure beam means has two support beams positioned substantially symmetrically about said axis of said shaft.

5. The transducer device as defined in claim 1, wherein said at least two gauges are substantially symmetrically oriented along a length of said support beam.

6. The transducer device as defined in claim 4, wherein said at least two gauges are substantially symmetrically oriented along a length of said support beam.

7. The transducer device as defined in claim 1, wherein said flexure beam means has a first and a second support beam and said strain gauge means includes four gauges and two gauges positioned on the first support beam and two gauges positioned on the second support beam.

8. The transducer device as defined in claim 6, wherein said flexure beam means has a first and a second support beam and said strain gauge means includes four gauges and two gauges positioned on the first support beam and two gauges positioned on the second support beam.

9. The transducer device as defined in claim 7, wherein said four gauges are substantially symmetrically oriented along a length of said support beams.

10. The transducer device as defined in claim 8, wherein said four gauges are substantially symmetrically oriented along a length of said support beams.

11. The transducer device as defined in claim 8, wherein said gauges on said support beams are substantially symmetrically oriented with one another.

12. The transducer device as defined in claim 1, wherein said collar adaptor includes a shaft cavity to telescopically receive said one end of said shaft, and at least one lock pin extendable from a surface of said cavity to engage a surface of said shaft to frictionally and non-rotatably secure said shaft in said shaft cavity.

13. The transducer device as defined in claim 11, wherein said collar adaptor includes a shaft cavity to telescopically receive said one end of said shaft, and at least one lock pin extendable from a surface of said cavity to engage a surface of said shaft to frictionally and non-rotatably secure said shaft in said shaft cavity.

14. The transducer device as defined in claim 12, wherein said shaft cavity has a generally circular cross-sectional shape and has two lock pins extendable from said cavity surface and positioned about 20°–180° apart from one another.

15. The transducer device as defined in claim 13, wherein said shaft cavity has a generally circular cross-sectional shape and has two lock pins extendable from said cavity surface and positioned about 20°–180° apart from one another.

16. The transducer device as defined in claim 1, wherein said collar cavity has a generally circular cross-sectional shape to receive said one end of said collar adaptor, said collar adaptor has a generally cross-section shape that is at least equal in size to said collar cavity.

17. The transducer device as defined in claim 15, wherein said collar cavity has a generally circular cross-sectional shape to receive said one end of said collar adaptor, said collar adaptor has a generally cross-section shape that is at least equal in size to said collar cavity.

18. The transducer device as defined in claim 1, wherein at least one end of said collar adaptor is beveled.

19. The transducer device as defined in claim 17, wherein at least one end of said collar adaptor is beveled.

20. The transducer device as defined in claim 1, wherein said bearing is a self-aligned bearing.

21. A transducer device for connecting one end of a shaft to a support frame including housing means, flexure beam means and strain gauge means, said flexure beam means rotatably secured to said housing means and cantilever supported toward said shaft, said strain gauge means mounted on said flexure beam means to create a signal indicative of flexure of said beam means, said flexure beam means including at least one support beam oriented about a longitudinal axis of said shaft, said strain gauge means including at least two gauges, at least one of said strain gauges mounted on said support beam, said strain gauge means electrically connected to measure radial forces applied to said shaft.

22. The transducer device as defined in claim 21, wherein said flexure beam means has two support beams positioned substantially parallel to one another.

23. The transducer device as defined in claim 21, wherein said flexure beam means has two support beams positioned substantially symmetrically about said axis of said shaft.

24. The transducer device as defined in claim 22, wherein said flexure beam means has two support beams positioned substantially symmetrically about said axis of said shaft.

25. The transducer device as defined in claim 21, wherein said at least two gauges are substantially symmetrically oriented along a length of said support beam.

26. The transducer device as defined in claim 24, wherein said at least two gauges are substantially symmetrically oriented along a length of said support beam.

27. The transducer device as defined in claim 26, wherein said flexure beam means has a first and a second support beam and said strain gauge means includes four gauges and two gauges positioned on the first support beam and two gauges positioned on the second support beam.

28. The transducer device as defined in claim 27, wherein said flexure beam means has a first and a second support beam and said strain gauge means includes four gauges and two gauges positioned on the first support beam and two gauges positioned on the second support beam.

29. The transducer device as defined in claim 28, wherein said gauges on said two beams are substantially symmetrically oriented with one another.

30. The transducer device as defined in claim 21, wherein said housing means includes a front plate and a plate connector, said plate connector positionable between a secured and non-secured position, said front plate frictionally engageable with said flexure beam means to inhibit rotation thereof in said secured position, said flexure beam means rotatable about an axis of said housing means when said front plate is in said non-secured position.

31. The transducer device as defined in claim 29, wherein said housing means includes a front plate and a plate connector, said plate connector positionable between a secured and non-secured position, said front plate frictionally engageable with said flexure beam means to inhibit rotation thereof in said secured position, said flexure beam means rotatable about an axis of said housing means when said front plate is in said non-secured position.

32. The transducer device as defined in claim 21, wherein said housing means includes a back plate and a plate connector, said plate connector positionable between a secure and non-secure position, said back plate frictionally engageable with said flexure beam means to inhibit rotation thereof in said secured position, said flexure beam means rotatable about an axis of said housing means when said back plate is in said non-secured position.

33. The transducer device as defined in claim 31, wherein said housing means includes a back plate and a plate connector, said plate connector positionable between a secured and non-secured position, said back plate frictionally engageable with said flexure beam means to inhibit rotation thereof in said secured position, said flexure beam means rotatable about an axis of said housing means when said back plate is in said non-secured position.

34. The transducer as defined in claim 30, wherein said flexure beam means includes at least one slot to receive said plate connector, said slot sized to allow said connector to move within said slot as said flexure beam means is rotated about the axis of said housing means.

35. The transducer as defined in claim 32, wherein said flexure beam means includes at least one slot to receive said plate connector, said slot sized to allow said connector to move within said slot as said flexure beam means is rotated about the axis of said housing means.

36. The transducer as defined in claim 33, wherein said flexure beam means includes at least one slot to receive said plate connector, said slot sized to allow said connector to move within said slot as said flexure beam means is rotated about the axis of said housing means.

37. The transducer as defined in claim 21, including a self-aligning bearing rotatably supporting said one end of said shaft.

38. The transducer as defined in claim 36, including a self-aligning bearing rotatably supporting said one end of said shaft.

39. The transducer as defined in claim 37, including a collar adaptor reasonably secured to said one end of said shaft, one end of said collar adaptor frictionally and non-rotatably secured to said bearing.

40. The transducer as defined in claim 38, including a collar adaptor reasonably secured to said one end of said shaft, one end of said collar adaptor frictionally and non-rotatably secured to said bearing.

41. The transducer device as defined in claim 40, wherein said collar adaptor includes a shaft cavity to telescopically receive said one end of said shaft, and at least one lock pin extendable from a surface of said cavity to engage a surface of said shaft to frictionally and non-rotatably secure said shaft in said shaft cavity.

42. The transducer device as defined in claim 41, wherein said shaft cavity has a generally circular cross-sectional shape and has two lock pins extendable from said cavity surface and positioned about 20°–180° apart from one another.

43. The transducer device as defined in claim 42, wherein said collar cavity has a generally circular cross-sectional shape to receive said one end of said collar adaptor, said collar adaptor has a generally cross-section shape that is at least equal in size to said collar cavity.

44. The transducer device as defined in claim 43, wherein at least one end of said collar adaptor is beveled.

45. A transducer device for connecting one end of a shaft to a support frame including a housing means, flexure beam means, and strain gauge means, said flexure beam means cantilever supported at one end and extending toward said shaft, said strain gauge means mounted on said flexure beam means, said flexure beam means including a back portion, front portion and at least one support beam and at least one rigidity beam connected therebetween, said support beam oriented about a longitudinal axis of said shaft, said strain gauge means including a plurality of strain gauges mounted on said support beam, said strain gauge means electrically connected to measure radial forces applied to said shaft and which radial forces are representative of a tension in a moving web.

46. The transducer device as defined in claim 45, wherein said back portion including an outer frame which at least partially encircles the end of said shaft, said front portion includes an inner frame which at least partially encircles the end of said shaft, said rigidity beam connected between said inner and outer frames.

47. The transducer device as defined in claim 46, wherein said flexure beam means includes two rigidity beams, said two gauge support beams and each of said rigidity beams substantially symmetrically spaced about a longitudinal axis of said shaft.

48. The transducer device as defined in claim 45, wherein said flexure beam means has two support beams positioned substantially parallel to one another.

49. The transducer device as defined in claim 45, wherein said flexure beam means has two support beams positioned substantially symmetrically about said axis of said shaft.

50. The transducer device as defined in claim 48, wherein said flexure beam means has two support beams positioned substantially symmetrically about said axis of said shaft.

51. The transducer device as defined in claim 45, wherein said at least two gauges are substantially symmetrically oriented along a length of said support beam.

52. The transducer device as defined in claim 45, wherein said flexure beam means has two support beams and said strain gauge means includes four gauges and two gauges positioned on one support beam and two gauges positioned on another support beam.

53. The transducer device as defined in claim 52, wherein said four gauges are substantially symmetrically oriented along a length of said two support beams.

54. The transducer as defined in claim 45, including a bearing rotatably supporting said one end of said shaft.

55. The transducer as defined in claim 54, including a collar adaptor reasonably secured to said one end of said shaft, one end of said collar adaptor frictionally and non-rotatably secured to said bearing.

56. The transducer device as defined in claim 55, wherein said collar adaptor includes a shaft cavity to telescopically receive said one end of said shaft, and at least one lock pin extendable from a surface of said cavity to engage a surface of said shaft to frictionally and non-rotatably secure said shaft in said shaft cavity.

57. The transducer device as defined in claim 45, wherein said flexure beam means is rotatably secured to said housing means.

58. The transducer device as defined in claim 57, wherein said housing means includes a front plate and a plate connector, said plate connector positionable between a secured and non-secured position, said front plate frictionally engageable with said flexure beam means to inhibit rotation thereof in said secured position, said flexure beam means rotatable about an axis of said housing means when said front plate is in said non-secured position.

59. The transducer device as defined in claim 57, wherein said housing means includes a back plate and a plate connector, said plate connector positionable between a secure and non-secure position, said back plate frictionally engageable with said flexure beam means to inhibit rotation thereof in said secured position, said flexure beam means rotatable about an axis of said housing means when said back plate is in said non-secured position.

60. The transducer device as defined in claim 58, wherein said housing means includes a back plate and a plate connector, said plate connector positionable between a secure and non-secure position, said back plate frictionally engageable with said flexure beam means to inhibit rotation thereof in said secured position, said flexure beam means rotatable about an axis of said housing means when said back plate is in said non-secured position.

61. The transducer as defined in claim 58, wherein said flexure beam means includes at least one slot to receive said plate connector, said slot has a size to allow said connector to move within said slot as said flexure beam means is rotated about the axis of said housing means.

62. The transducer device as defined in claim 45, wherein at least a portion of said rigidity beam lies in a non-parallel plane to a longitudinal axis of said shaft.

63. The transducer device as defined in claim 45, wherein at least a portion of said rigidity beam lies in a non-parallel plane to at least one of said support beams.

64. The transducer device as defined in claim 45, wherein said at least one rigidity beam has an adjustable rigidity.

65. The transducer device as defined in claim 46, including a lubricant arrangement connected between said outer frame and inner frame to transport lubricant to an interior of said inner frame.

66. The transducer device as defined in claim 65, wherein said lubricant arrangement includes a flexible passageway extending between said inner and outer frame.

67. The transducer device as defined in claim 48, wherein said strain gauge means is positioned on the inner surfaces of said two support beams.

68. A method of reducing resonance in a transducer device comprising the steps of:

a. providing a shaft having a longitudinal axis to handle a continuously moving web passing partly around the shaft and said web being tensioned by the shaft;

b. supporting one end of said shaft to a frame by the transducer device including flexure beam means cantilever supported at one end and extending toward said shaft, and strain gauge means mounted on said flexure beam means, said flexure beam means has at least one gauge support beam and at least one rigidity beam oriented about said longitudinal axis of said shaft, said strain gauge means including a plurality of strain gauges;

c. positioning at least one of said strain gauges on at least one of said two support beams;

d. electrically connecting said strain gauge means to measure radial forces applied to said shaft; and e. adjusting a thickness of at least one of said rigidity beams to alter the rigidity of said flexure beam means.

\* \* \* \* \*